United States Patent
Osborn

(10) Patent No.: US 6,964,040 B2
(45) Date of Patent: Nov. 8, 2005

(54) OPTIMIZING STORAGE AND RETRIEVAL OF MONITORING DATA

(75) Inventor: Mark David Osborn, Albany, NY (US)

(73) Assignee: General Electric Company, Niskayuna, NY (US)

( * ) Notice: Subject to any disclaimer, the term of this patent is extended or adjusted under 35 U.S.C. 154(b) by 842 days.

(21) Appl. No.: 09/681,702

(22) Filed: May 23, 2001

(65) Prior Publication Data

US 2003/0120619 A1 Jun. 26, 2003

(51) Int. Cl.[7] ................................................. G06F 9/45
(52) U.S. Cl. ..................................... 717/151; 369/47.18
(58) Field of Search ................................ 717/151, 152; 369/47.18; 707/3, 10

(56) References Cited

U.S. PATENT DOCUMENTS

| | | | |
|---|---|---|---|
| 5,987,242 A | * 11/1999 | Bentley et al. | 703/13 |
| 6,112,126 A | * 8/2000 | Hales et al. | 700/29 |
| 6,484,180 B1 | * 11/2002 | Lyons et al. | 707/103 R |
| 6,513,041 B2 | * 1/2003 | Tarin | 707/10 |
| 6,721,859 B1 | * 4/2004 | Smyers | 711/154 |
| 2002/0004846 A1 | * 1/2002 | Garcia-Luna-Aceves et al. | 709/245 |
| 2002/0073082 A1 | * 6/2002 | Duvillier et al. | 707/3 |
| 2003/0120619 A1 | * 6/2003 | Osborn | 706/19 |
| 2004/0139070 A1 | * 7/2004 | Dysart et al. | 707/3 |

* cited by examiner

Primary Examiner—John Chavis
(74) Attorney, Agent, or Firm—Fletcher Yoder

(57) ABSTRACT

Optimizing storage and retrieval of monitoring data. In one aspect of this disclosure, there is a system, method and computer readable medium that stores instructions for instructing a computer system, to optimize storage and retrieval of data. In this embodiment, a transfer manager component acquires the data from an archive and assigns predetermined storage values to specified parameters that form the data structure of the acquired data. A database stores the data acquired by the transfer manager component in accordance with the predetermined storage values. A middle tier component extracts the data in the database and interpolates the data in accordance with the predetermined storage values.

55 Claims, 5 Drawing Sheets

OPTIMIZING STORAGE AND RETRIEVAL OF MONITORING DATA

BACKGROUND OF INVENTION

This disclosure relates generally to remote monitoring and diagnosing of industrial equipment and more particularly to optimizing storage and retrieval of monitoring data.

Generally, there are a lot of data generated from the remote monitoring and diagnosing of industrial equipment such as turbines, aircraft engines, locomotives, etc. Change detect monitoring data are one particular type of data that are of interest to industrial equipment monitoring specialists. Change detect monitoring are data that have typically passed through a compression algorithm such as a "swinging door compression", the purpose of which is to reduce the amount of data stored in an archive by removing non-significant changes. The swinging door compression discards values that fall on a line connecting values that are recorded in the archive. When a new value is received by the system implementing the compression, the previous value is recorded only if any of the values since the last recorded value do not fall within the compression deviation area. The deviation area is a parallelogram extending between the last recorded value and the new value with a width equal to twice the compression deviation specification.

One particular area where change detect monitoring data are of interest is in the monitoring and diagnosing of a turbine. Typically, a multiple of sensors (e.g. 1000) collect data from the turbine using a commercially available change detect application. An on-site monitoring unit receives data from each sensor. The on-site monitoring unit then stores the data in a local archive. Generally, the on-site monitoring unit stores only data that represents a significant change from values of previous measurements in the local archive. Depending upon how a monitoring specialist has defined a significant change, it is possible that some sensors may have a measurement stored in the local archive every few seconds, while other sensors may have measurements stored at longer intervals such as every eight hours.

The local archive periodically transfers the data to a central site for subsequent monitoring and diagnosing by monitoring specialists and analytical tools. In order to adequately monitor the operation of the turbine, the monitoring specialists and analytical tools typically have to analyze a tremendous amount of data. Currently available database systems do not provide a storage and retrieval schema that can efficiently handle the large amount of data. Generally, these database systems use a simplistic storage schema such as tables to store the measurements collected from the sensors. Since there is a large amount of sensors providing data to the on-site monitor and local archive, there is a need for a large amount of storage. Providing enough storage to handle the increased demand can be quite expensive. With regard to the retrieval schema, the currently available database systems use indexes such as a B-tree index to provide the monitoring specialist and analytical tools with access to the stored data. Since there can be as many as 1000 sensors that provide data to the on-site monitor and local archive, there will be a need to perform a separate asynchronous query to access the data for each of the sensors since the two measurements just prior to and past the time period being examined must be retrieved to allow for correct interpolation. Processing 1000 separate and asynchronous queries is very central processing unit (CPU) intensive and storage intensive.

In order to overcome the above problems, there is a need for a database system that has an efficient storage schema that can minimize the size of data stored and provide indexes that enable access to the data in a timely fashion.

SUMMARY OF INVENTION

In one aspect of this disclosure, there is a system, method and computer readable medium that stores instructions for instructing a computer system, to optimize storage and retrieval of data. In this embodiment, a transfer manager component acquires the data from an archive and assigns predetermined storage values to specified parameters that form the data structure of the acquired data. A database stores the data acquired by the transfer manager component in accordance with the predetermined storage values. A middle tier component extracts the data in the database and interpolates the data in accordance with the predetermined storage values.

In another aspect of this disclosure, there is a system, method and computer readable medium that stores instructions for instructing a computer system, to optimize storage and retrieval of change detect monitoring data. In this embodiment, a transfer manager component acquires the change detect monitoring data from an archive. In addition, the transfer manager component assigns predetermined storage values to specified parameters that form the data structure of the acquired data, wherein the predetermined storage values comprise at least one of a time block value and a time filter value. A database stores the change detect monitoring data acquired by the transfer manager component in accordance with the time block value and time filter value. A middle tier component extracts the change detect monitoring data in the database and interpolates the data in accordance with the time block value and time filter value.

In a third aspect of this disclosure, there is a system, method and computer readable medium that stores instructions for instructing a computer system, to optimize storage and retrieval of change detect monitoring data. In this embodiment, a transfer manager component acquires the change detect monitoring data from an archive. In addition, a transfer manager component assigns predetermined storage values to specified parameters that form the data structure of the acquired data, wherein the predetermined storage values comprise at least one of a time block value and a time filter value. A database stores the change detect monitoring data acquired by the transfer manager component in accordance with the time block value and a time filter value, wherein the database uses the time block and time filter values as values to index using bit map indexes. A middle tier component extracts the change detect monitoring data in the database and interpolates the data in accordance with the time block value and time filter value.

In still another aspect of this disclosure, there is a system for optimizing storage and retrieval of change detect monitoring data. In this embodiment, an acquiring means acquires the change detect monitoring data from an archive. An assigning means assigns predetermined storage values to specified parameters that form the data structure of the acquired change detect monitoring data, wherein the predetermined storage values comprise at least one of a time block value and a time filter value. A storing means stores the acquired change detect monitoring data in accordance with the time block value and time filter value. An extracting means extracts the stored change detect monitoring data. An interpolating means interpolates the change detect monitoring data in accordance with the time block value and time filter value.

In a fifth aspect of this disclosure, there is system, method and computer readable medium that stores instructions for instructing a computer system, to optimize storage and retrieval of change detect monitoring data. In this embodiment, a monitoring unit monitors change detect data obtained by at least one sensing unit. An archive stores the change detect monitoring data. A remote storage and retrieval site comprises a transfer manager component that acquires the change detect monitoring data from the archive. In addition, the transfer manager component assigns predetermined storage values to specified parameters that form the data structure of the acquired data, wherein the predetermined storage values comprise at least one of a time block value and a time filter value. A database stores the change detect monitoring data acquired by the transfer manager component in accordance with the time block value and time filter value. A middle tier component extracts the change detect monitoring data in the database and interpolates the data in accordance with the time block value and time filter value.

DETAILED DESCRIPTION

Figure 1:
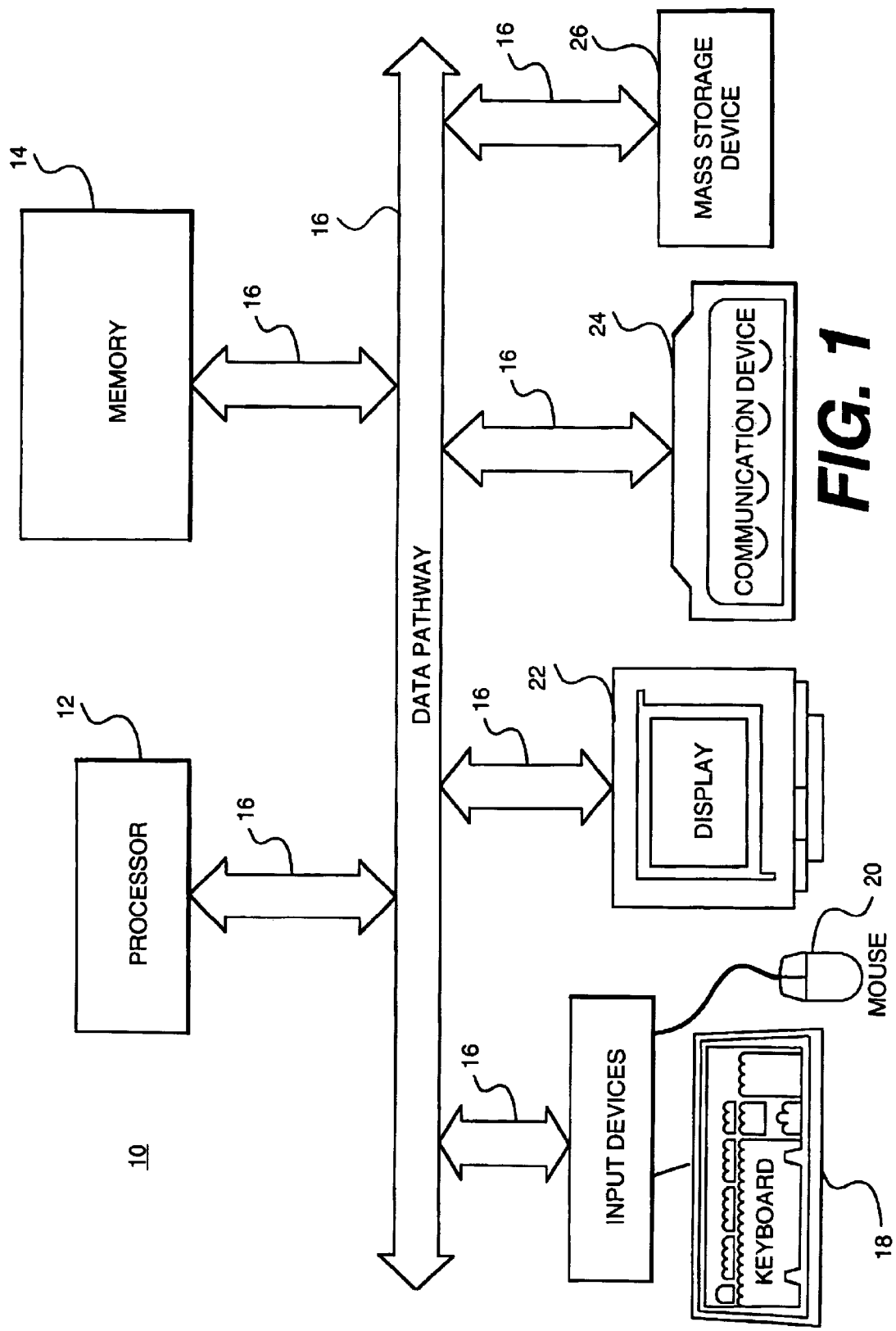
FIG. 1 shows a schematic diagram of a general-purpose computer system in which a system for optimizing storage and retrieval of data operates.

This disclosure describes a system, method and computer product for optimizing storage and retrieval of data from a system, process or machine such as a turbine, power system, locomotive, automobile, computer or appliance. Although this disclosure will be described with reference to a turbine, it can be used in conjunction with any system or process which generates sensor data and where it is desirable to monitor or diagnose system behavior. FIG. 1 shows a schematic diagram of a general-purpose computer system 10 in which a system for optimizing storage and retrieval of data operates. The computer system 10 generally comprises a processor 12, memory 14, input/output devices, and data pathways (e.g., buses) 16 connecting the processor, memory and input/output devices. The processor 12 accepts instructions and data from memory 14 and performs various calculations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, memory 14 preferably contains an operating system, which executes on the processor 12. The operating system performs basic tasks that include recognizing input, sending output to output devices, keeping track of files and directories and controlling various peripheral devices.

The input/output devices may comprise a keyboard 18 and a mouse 20 that enter data and instructions into the computer system 10. Also, a display 22 may be used to allow a user to see what the computer has accomplished. Other output devices may include a printer, plotter, synthesizer and speakers. A communication device 24 such as a telephone or cable modem or a network card such as an Ethernet adapter, local area network (LAN) adapter, integrated services digital network (ISDN) adapter, Digital Subscriber Line (DSL) adapter or wireless access card, enables the computer system 10 to access other computers and resources on a network such as a LAN, wireless LAN or wide area network (WAN). A mass storage device 26 may be used to allow the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, notebook computer, personal computer, workstation, mini-computer, mainframe computer or supercomputer.

Figure 2:
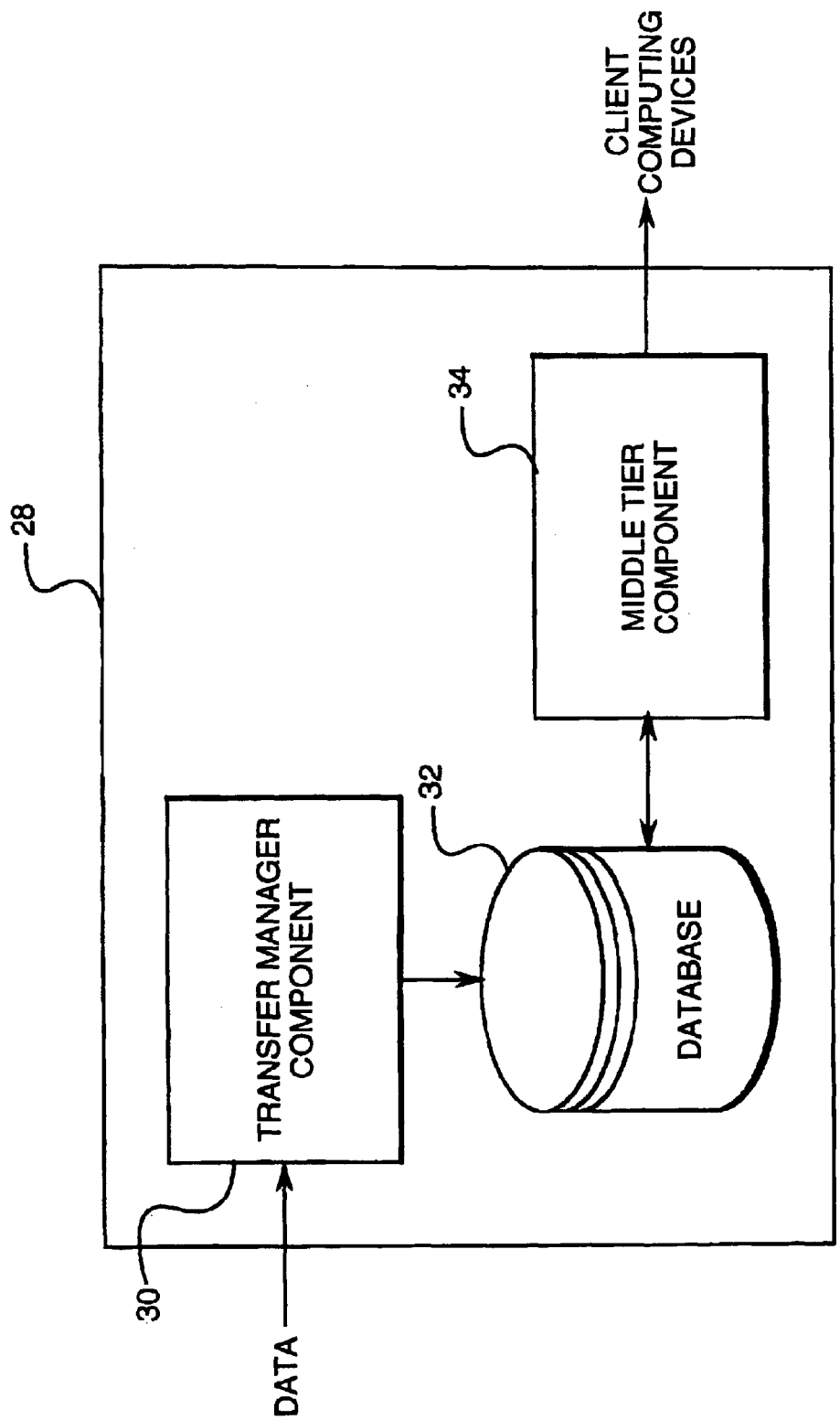
FIG. 2 shows a top-level component architecture diagram of an optimizing storage and retrieval system that operates on the computer system shown in FIG. 1.

FIG. 2 shows a top-level component architecture diagram of an optimizing storage and retrieval system 28 that operates on the computer system 10 shown in FIG. 1. Generally, the optimizing storage and retrieval system 28 provides an efficient method for the storage and retrieval of data such as change detect monitoring data. Although this disclosure will be described with reference to the storage and retrieval of change detect monitoring data, one of ordinary skill in the art will recognize that other types of data are suitable for use with the teachings of this disclosure. The optimizing storage and retrieval system 28 comprises a transfer manager component 30 that acquires data obtained from an archive (not shown). A plurality of sensing units (not shown) take various measurements from the turbine. An illustrative, but non-exhaustive list of measurements taken from the turbine may include vibration, compressor-pressure, IGV position, inlet bleeding position, VIVG reference angle, inlet heating position, generator frequency, etc. A monitoring unit (not shown) monitors the change detect data obtained by the sensing units and puts them into the archive. Preferably, the monitoring unit and the archive are located local with respect to the turbine and the sensing units, however, it is possible to have these elements reside local with respect to the optimizing storage and retrieval system 28.

In addition to acquiring data from an archive, the transfer manager component 30 assigns predetermined storage values to specified parameters that form the data structure of the acquired data. Generally, the data structure for this disclosure is in the form presented below.

| TagName | DateTime | Value | Flag |

The TagName parameter field is representative of the sensing unit or tag that has obtained data from the turbine. The DateTime parameter field is representative of the time that the particular sensing unit obtained a measurement from the turbine. The Value parameter field is representative of the value of the measurement obtained by the particular sensing unit. The Flag parameter field is representative of how reliable the measurement value obtained from the particular sensing unit is. For example, a "0" may be an indication that the measurement value is very reliable and values in the range of "1" through "10" may be an indication that the measurement value is not very reliable. One of ordinary skill in the art will recognize that the other designations may be used to represent how reliable a measurement value is.

Querying data that are in this type of structure becomes more complicated as the number of sensing units increase. For example, if there are 1000 sensing units, then it possible that there could be a request for 1000 sensing unit results, which is equivalent to 1000 separate asynchronous queries. In this disclosure, the need to generate 1000 separate asynchronous queries is avoided by adding two parameters to the above data structure. The two parameters are designated as TimeBlock and Filter. The data structure then takes the form as follows:

| TagName | DateTime | Value | Flag | TimeBlock | Filter |

The TimeBlock parameter field is representative of a block of time (e.g., an 8 hour block) assigned a number representing the number of time blocks that have passed since an epoch e.g., 00:00:00 Jan. 1, 1970. For instance, 04:00:00 Jan. 1, 1970 could be assigned a 0 and 12:00:00 Jan. 1, 1970 could be assigned a 1. The description of time in terms of blocks allows for the use of bitmap indexing which requires fields with a low cardinality to be efficient. The Filter parameter is representative of a suitable data measurement for use in interpolating at a set of fixed time intervals starting after an epoch. In this disclosure, Filter values are applied to time intervals of 1 second, 5 seconds, 10 seconds, 30 seconds, 1 minute, 2 minutes, 5 minutes, 10 minutes, 30 minutes, 1 hour, 2 hours, 4 hours, 8 hours, 12 hours, 24 hours and 1 month. The Filter values that are applied to these time intervals are 0–15. In particular, 0 is applied to 1 second, 1 is applied to 5 seconds, 2 is applied to 10 seconds, 3 is applied to 30 seconds, 4 is applied to 1 minute, 5 is applied to 2 minutes, 6 is applied to 5 minutes, 7 is applied to 10 minutes, 8 is applied to 30 minutes, 9 is applied to 1 hour, 10 is applied to 2 hours, 11 is applied to 4 hours, 12 is applied to 8 hours, 13 is applied to 12 hours, 14 is applied to 24 hours and 15 is applied to 1 month. For example, if a DateTime value is 00:00 hours, then the assigned Filter value is 14 because of the 24 hour time mark. If one row has a DateTime value of 23:59 and a subsequent row has a DateTime value of 00:01 hours, then both rows are assigned a Filter value of 14 unless the change of day marked the end of the month, in which case a value of 15 would be assigned. This disclosure is not limited to the use of the DateTime and Filter parameters and the above designations. One of ordinary skill in the art will recognize that other parameters can be used in place of or in combination with the DateTime and Filter parameters.

A database 32 stores the data acquired by the transfer manager component after assigning the predetermined storage values. The database 32 is preferably a relational database, however, other types of data repositories may be used such as multi-dimensional databases, object-oriented databases and flat file databases. The database 32 uses the predetermined storages values assigned to the TimeBlock and Filter parameters as bit map indexes, which will improve the speed of subsequent queries.

A middle tier component 34 containing various functional modules processes data in the database 32 in response to client computing devices (not shown) running end-user applications. The middle tier component 34 preferably runs on a server such as an application server. Some of the functional modules performed by the middle tier component 34 include extracting the data in the database 32 and interpolating the data in accordance with the predetermined storage values. The middle tier component 34 extracts the data in the database 32 by generating a query. Generally, the middle tier component 34 generates the query by using a query language such as a structured query language (SQL), however, other methodologies such as query by example or choosing parameters from a menu may be used to generate a query. Below is an example of a query using SQL statements for the above data structure SELECT DATETIME, VALUE, FLAG
FROM CHANGE_DETECT_296300
WHERE TAGNAME IN ('TTXD1_10') AND TIMEBLOCK BETWEEN 333 AND 337
ORDER BY DATETIME This query will return values for the DateTime, Value and Flag parameters for the tag (i.e., sensor) that has a TagName of TTXD1 in the TimeBlock that ranges from 333 to 337.

The middle tier component 34 performs the interpolation on the extracted data because in many cases data are required in a time coherent format. That is, all data values have the same timestamp. With change detect this is clearly impossible since data are stored independently of each other so one has to interpolate to produce time coherent records. In this disclosure, the middle tier component 34 uses the Filter parameter to aid in the interpolation of the results from the query. In many cases only a representative set of data at various intervals is required for users and analysis tools. There is no need to decide that an 8 hour interpolated period begins at 8:04 rather than 8:00. Assuming this, one can mark suitable representative records at the various interpolation periods, for cases where gross analysis is required e.g., trends over a month or two. Below is another example of a query that is similar to the one presented above, however, this one has been adapted for interpolated points at intervals of 10 minutes (i.e., the Filter value is $\geq 7$).

SELECT DATETIME, VALUE, FLAG
FROM CHANGE_DETECT_296300
WHERE TAGNAME IN ('TTXD1_10') AND TIMEBLOCK BETWEEN 333 AND 337
AND FILTER>=7
ORDER BY DATETIME

The middle tier component 34 then partitions the extracted results into multiple record sets each containing data for only a single sensor (tag), such as a flat file. Below is an example of a data set for the TimeBlock (between 333 and 337) and Filter (>=7) values specified in the above query for a tag with a TagName equal to DWATT.

| Date Time | Value | Filter | Time Block |
|---|---|---|---|
| Apr. 20, 1999 00:22:29 | 158.4 | 14 | 327 |
| Apr. 20, 1999 00:37:55 | 158.2 | 8 | 327 |
| Apr. 20, 1999 00:39:36 | 158.2 | 7 | 327 |
| Apr. 20, 1999 00:48:24 | 158.2 | 9 | 327 |
| Apr. 20, 1999 01:00:59 | 158.2 | 9 | 327 |
| Apr. 20, 1999 01:30:58 | 159.5 | 8 | 327 |
| Apr. 20, 1999 01:40:42 | 159.5 | 10 | 327 |
| Apr. 20, 1999 02:08:46 | 159.5 | 10 | 327 |
| Apr. 20, 1999 02:11:10 | 159.3 | 8 | 327 |
| Apr. 20, 1999 02:37:10 | 158.7 | 8 | 327 |
| Apr. 20, 1999 02:39:26 | 158.9 | 9 | 327 |
| Apr. 20, 1999 03:02:20 | 158.8 | 9 | 328 |

-continued

| Date Time | Value | Filter | Time Block |
|---|---|---|---|
| Apr. 20, 1999 03:09:23 | 159.8 | 7 | 328 |
| Apr. 20, 1999 03:26:15 | 159.3 | 8 | 328 |
| Apr. 20, 1999 03:32.25 | 159.2 | 8 | 328 |
| Apr. 20, 1999 03:52:08 | 159 | 11 | 328 |
| Apr. 20, 1999 04:02:38 | 159.1 | 11 | 328 |
| Apr. 20, 1999 04:09:34 | 159 | 8 | 328 |
| Apr. 20, 1999 04:38:04 | 159.6 | 8 | 328 |
| Apr. 20, 1999 04:38:05 | 159.6 | 4 | 328 |
| Apr. 20, 1999 04:39:33 | 159.7 | 7 | 328 |
| Apr. 20, 1999 04:59:58 | 159.3 | 9 | 328 |
| Apr. 20, 1999 05:16:25 | 159.2 | 9 | 328 |
| Apr. 20, 1999 05:33:37 | 159.3 | 8 | 328 |

Note that this is only a simplified example of a data set for the specified Filter and TimeBlock parameters and that there will typically be additional records after the record for Apr. 20, 1999 05:33:37. Once the middle tier component 34 has interpolated the data, then the data are returned to the client computing devices running the end-user applications.

One of ordinary skill in the art will recognize that the middle tier component 34 may include other functional modules in addition to extracting and interpolating data. For example, the middle tier component may include functional modules that perform functions such as profiling to determine usage patterns of users or auditing to charge users for obtaining data.

In addition to providing an efficient storage schema that minimizes the size of data stored and allows access to the data in a timely fashion, the optimizing storage and retrieval system 28 enables efficient inserting and appending of new data to the database 32. The transfer manager component 30 performs the majority of the functionality that enables efficient inserting and appending of new data to the database 32. The transfer manager component 30 begins by extracting the data from the archive. In particular, the transfer manager component 30 extracts the data by generating a query. Generally, the transfer manager component 30 generates the query by using a query language such as SQL commands, however, other methodologies such as query by example or choosing parameters from a menu may be used to generate a query.

Next, the transfer manager component 30 determines TimeBlock values for the new data records. This may include determining a minimum and maximum TimeBlock value for the new data records. The minimum and maximum TimeBlock values are determined because bitmap indexes do not support the concept of unique values as per a B-Tree. So by inserting records, the component performing the insertion must manage avoiding inserting duplicate data records. This could occur if the transfer manager 30 was permitted to re-query an off-site monitoring unit for the same tags over the same time period twice. In addition, the determining of TimeBlock values may include retrieving existing data between the minimum and maximum Time-Block values for all of the sensors having new data. The transfer manager component 30 then labels the existing data as updated data. One of ordinary skill in the art will recognize that other labeling schemes may be used. After determining the TimeBlock, the transfer manager component 30 sorts the updated data records as by DateTime values. Next, the transfer manager component 30 determines Filter values for the data records of each sensor that have changed. The transfer manager component 30 discards the data records that have not changed because they are the same as records already in the database and thus do not have to be changed.

Below are some code that may be used to program the transfer manager component 30 to perform the above described inserting and appending of new data to the database 32. This code is written in pseudo-code, using Microsoft ADO (ActiveX Data Objects) terminology, which is a high level interface for data objects. One of ordinary skill in the art will recognize that the above described functions can be implemented in other programming languages such as C++, Visual Basic, Java, etc. Furthermore, one of ordinary skill in the art will recognize that the following is only an example of one way of programming the functions performed by the transfer manager component 30 and that others exist.

[Optional] Calculate maximum ($TB_{max}$) and minimum ($TB_{min}$) TIMEBLOCK for new data records.

[Optional] Fetch existing data between $TB_{min}-1$ and $TB_{max}+1$ for all tags in new data as client side record set ($R_{existing}$)

Insert new data records into $R_{existing}$ to give $R_{updated}$. Calculating TIMEBLOCK value but leaving FILTER as NULL.

Sort $R_{updated}$ by DATETIME

For each tag filter data for tag and calculate FILTER value (See VB code) where FILTER=NULL.

Filter records with adFilterPendingRecords to filter only records that have changed but not yet been sent to the server.

Call UpdateBatch for modified records in $R_{updated}$ with adAffectGroup (records that satisfy current Filter property setting.

Below is an example showing how the above code can be used on existing archive data and data to be inserted. The following are archived data results for a particular sensor having a TagName of DWATT.

| Date Time | Value | Filter | Time Block |
|---|---|---|---|
| Apr. 20, 1999 00:22:29 | 158.4 | 14 | 327 |
| Apr. 20, 1999 00:37:55 | 158.2 | 8 | 327 |
| Apr. 20, 1999 00:39:38 | 158.2 | 7 | 327 |
| Apr. 20, 1999 00:48:24 | 158.2 | 9 | 327 |
| Apr. 20, 1999 01:00:59 | 158.2 | 9 | 327 |
| Apr. 20, 1999 02:37:10 | 158.7 | 8 | 327 |
| Apr. 20, 1999 02:39:26 | 158.9 | 9 | 327 |
| Apr. 20, 1999 03:02:20 | 158.8 | 9 | 328 |
| Apr. 20, 1999 03:32:25 | 159.2 | 8 | 328 |
| Apr. 20, 1999 03.52:08 | 159 | 11 | 328 |
| Apr. 20, 1999 04:02:38 | 159.1 | 11 | 328 |
| Apr. 20, 1999 04:09:34 | 159 | 8 | 328 |
| Apr. 20, 1999 05:16:25 | 159.2 | 9 | 328 |

Below is the data that are to be inserted. Note that some of the data are duplicates of the existing archive data.

| Date Time | Value | Filter | Time Block |
|---|---|---|---|
| Apr. 20, 1999 04:02:38 | 159.1 | | 328 |
| Apr. 20, 1999 03:32:25 | 159.2 | | 328 |
| Apr. 20, 1999 05:16:25 | 159.2 | | 328 |
| Apr. 20, 1999 02:11:10 | 159.3 | | 327 |
| Apr. 20, 1999 03:26:15 | 159.3 | | 328 |
| Apr. 20, 1999 04:59:59 | 159.3 | | 328 |
| Apr. 20, 1999 05:33:37 | 159.3 | | 328 |
| Apr. 20, 1999 01:30:58 | 159.5 | | 327 |
| Apr. 20, 1999 01:40:42 | 159.5 | | 327 |
| Apr. 20, 1999 02:08:46 | 159.5 | | 327 |
| Apr. 20, 1999 05:45:11 | 159.5 | | 328 |
| Apr. 20, 1999 04:38.04 | 159.6 | | 328 |
| Apr. 20, 1999 04:38:05 | 159.6 | | 328 |

-continued

| Date Time | Value | Filter | Time Block |
|---|---|---|---|
| Apr. 20, 1999 04:39:33 | 159.7 | | 328 |
| Apr. 20, 1999 03:09:23 | 159.8 | | 328 |

The filter values that the transfer manager component assigns to the data is as follows:

| Date Time | Value | Filter | Time Block |
|---|---|---|---|
| Apr. 20, 1999 01:30:58 | 159.5 | 14 | 327 |
| Apr. 20, 1999 01:40:42 | 159.5 | 10 | 327 |
| Apr. 20, 1999 02:08:46 | 159.5 | 10 | 327 |
| Apr. 20, 1999 02:11:10 | 159.3 | 9 | 327 |
| Apr. 20, 1999 03:09:23 | 159.8 | 9 | 328 |
| Apr. 20, 1999 03:26:15 | 159.3 | 8 | 328 |
| Apr. 20, 1999 03:32:25 | 159.2 | 11 | 328 |
| Apr. 20, 1999 04:02:38 | 159.1 | 11 | 328 |
| Apr. 20, 1999 04:38:04 | 159.6 | 8 | 328 |
| Apr. 20, 1999 04:38:05 | 159.6 | 4 | 328 |
| Apr. 20, 1999 04:39:33 | 159.7 | 7 | 328 |
| Apr. 20, 1999 04:59:58 | 159.3 | 9 | 328 |
| Apr. 20, 1999 05:16:25 | 159.2 | 9 | 328 |
| Apr. 20, 1999 05:33:37 | 159.3 | 8 | 328 |
| Apr. 20, 1999 05:45:11 | 159.5 | 14 | 328 |

Inserting these data records into the database 32 except for duplicate records (i.e., records containing identical Datetime values and TagNames) results in the following records. Note that the inserted records are shown in bold.

| Date Time | Value | Filter | Time Block |
|---|---|---|---|
| Apr. 20, 1999 00:22:29 | 158.4 | 14 | 327 |
| Apr. 20, 1999 00:37:55 | 158.2 | 8 | 327 |
| Apr. 20, 1999 00:39:36 | 158.2 | 7 | 327 |
| Apr. 20, 1999 00:48:24 | 158.2 | 9 | 327 |
| Apr. 20, 1999 01:00:59 | 158.2 | 9 | 327 |
| Apr. 20, 1999 01:30:58 | 159.5 | 14 | 327 |
| Apr. 20, 1999 01:40:42 | 159.5 | 10 | 327 |
| Apr. 20, 1999 02:08:46 | 159.5 | 10 | 327 |
| Apr. 20, 1999 02:11:10 | 159.3 | 9 | 327 |
| Apr. 20, 1999 02:37:10 | 158.7 | 8 | 327 |
| Apr. 20, 1999 02:39:26 | 158.9 | 9 | 327 |
| Apr. 20, 1999 03:02:20 | 158.8 | 9 | 328 |
| Apr. 20, 1999 03:09:23 | 159.8 | 9 | 328 |
| Apr. 20, 1999 03:26:15 | 159.3 | 8 | 328 |
| Apr. 20, 1999 03:32:25 | 159.2 | 8 | 328 |
| Apr. 20, 1999 03:52:08 | 159 | 11 | 328 |
| Apr. 20, 1999 04:02:38 | 159.1 | 11 | 328 |
| Apr. 20, 1999 04:09:34 | 159 | 8 | 328 |
| Apr. 20, 1999 04:38:04 | 159.6 | 8 | 328 |
| Apr. 20, 1999 04:38:05 | 159.6 | 4 | 328 |
| Apr. 20, 1999 04:39:33 | 159.7 | 7 | 328 |
| Apr. 20, 1999 04:59:58 | 159.3 | 9 | 328 |
| Apr. 20, 1999 05:16:25 | 159.2 | 9 | 328 |
| Apr. 20, 1999 05:33:37 | 159.3 | 8 | 328 |
| Apr. 20, 1999 05:45:11 | 159.5 | 14 | 328 |

The optimizing storage and retrieval system 28 is not limited to the transfer manager component 30, database 32 and middle tier component 34. One of ordinary skill in the art will recognize that the optimizing storage and retrieval system 28 may have other components. For example, the optimizing storage and retrieval system 28 could also include a cache for frequently requested or latest data.

Figure 3:
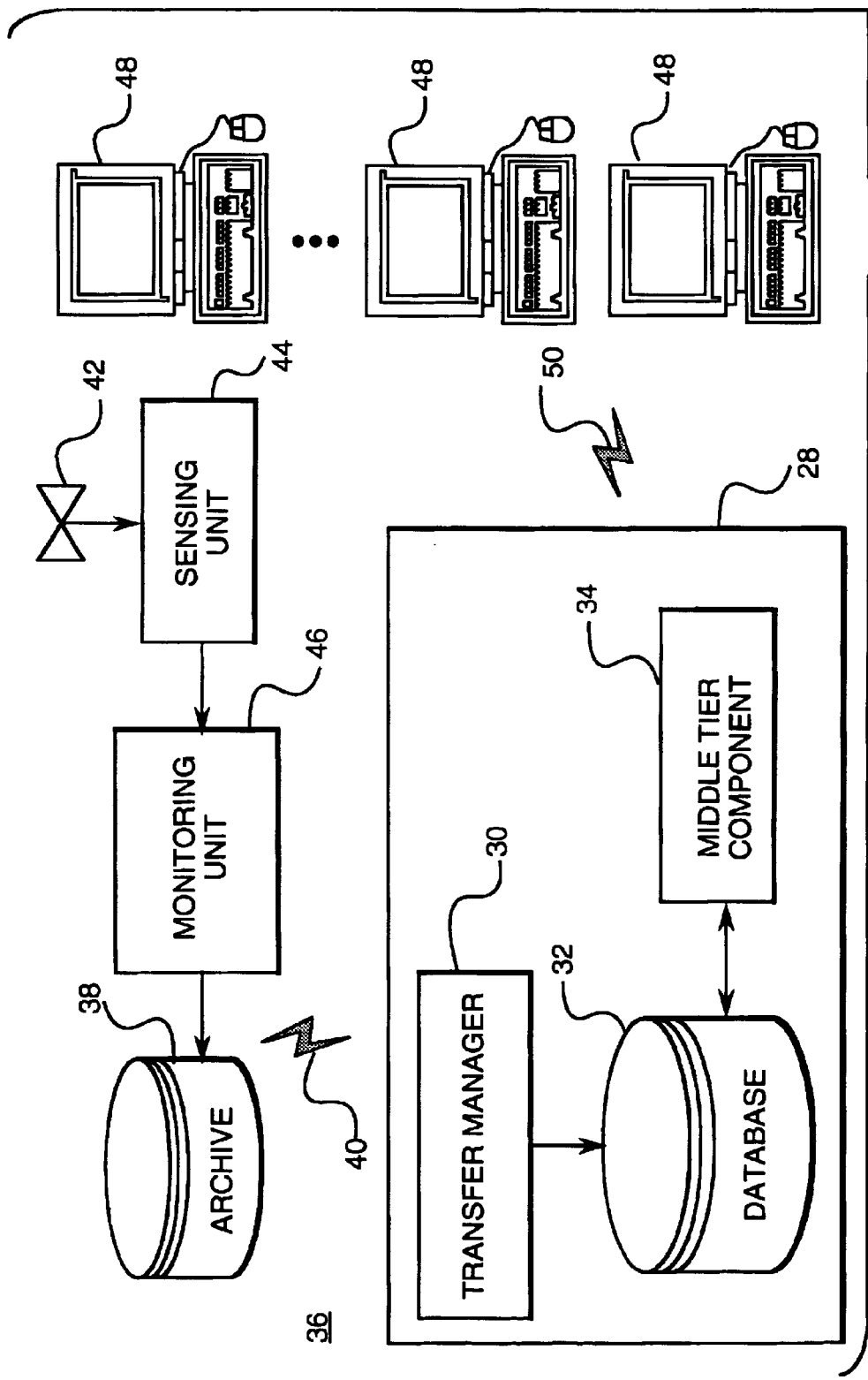
FIG. 3 shows an architectural diagram of a system that implements the optimizing storage and retrieval system shown in FIG. 2.

FIG. 3 shows an architectural diagram of a system 36 that implements the optimizing storage and retrieval system 28 shown in FIG. 2. In FIG. 3, the optimizing storage and retrieval system 28 communicates with an archive 38 over a communication network 40. The archive 38 is a data repository such as a relational database management system (RDBMS) or a proprietary database such as a PI Archive from OSI with physical storage on an NTFS or FAT file system, however, other storage mediums may be used. The archive contains change detect data obtained from a turbine 42. The communication network 40 may be an electronic or wireless network such as a private network (e.g. an extranet or intranet) or a global network such as a WAN (e.g., Internet). A plurality of sensing units 44 take various measurements from the turbine 42. For ease of illustration, FIG. 3 only shows one sensing unit 44, however, it is possible to have up to 1000 sensing units monitoring a turbine. An illustrative, but non-exhaustive list of measurements taken from the turbine by the sensing units may comprise measurements such as vibration, compressor-pressure, IGV position, inlet bleeding position, VIVG reference angle, inlet heating position, generator frequency, etc.

A monitoring unit 46 monitors the change detect data obtained by the sensing units and puts them into the archive. The monitoring unit 46 generally receives data from each of the sensing units 44 via a controller (not shown). Preferably, the monitoring unit and the archive are located local with respect to the turbine and the sensing units, however, it is possible to have these elements reside local with respect to the optimizing storage and retrieval system 28.

Computing units 48 communicate with the optimizing storage and retrieval system 28 via an end-user application running on each of the computing units over a network 50. The computing units 48 can take the form of a hand-held digital computer, personal digital assistant computer, notebook computer, personal computer or workstation. The end-user applications may be commercially available database management systems or specially developed applications programmed to interact with the optimizing storage and retrieval system 28. Furthermore, the end-user application may be a Web-based tool that uses a browser such as Microsoft INTERNET EXPLORER, Netscape NAVIGATOR or Mosaic to interact with the optimizing storage and retrieval system 28. The network 50 may be an electronic or wireless network that connects the computing units 48 to the optimizing storage and retrieval system 28. The network 50 may be a private network such as an extranet or intranet or a global network such as a WAN (e.g., Internet). Generally, the end-user application generates a request to the optimizing storage and retrieval system 28 to view the data in the database 32. The middle tier component returns the data to the end-user applications over the network 50. The data can be sent on Web pages that are in the form of HTML, however, other formats and structures can be used such as SGML, XML or XHTML.

If desired, the system 36 may have functionality that enables authentication and access control of users accessing the optimizing storage and retrieval system 28. Both authentication and access control can be handled at the optimizing storage and retrieval system 28 level by a commercially available package such as Netegrity SITEMINDER. Information to enable authentication and access control such as the user names, location, telephone number, organization, login identification, password, access privileges to certain resources, physical devices in the network, services available to physical devices, etc. can be retained in a database directory. The database directory can take the form of a lightweight directory access protocol (LDAP) database; however, other directory type databases with other types of schema may be used including relational databases, object-oriented databases, flat files, or other data management systems.

Figure 4:
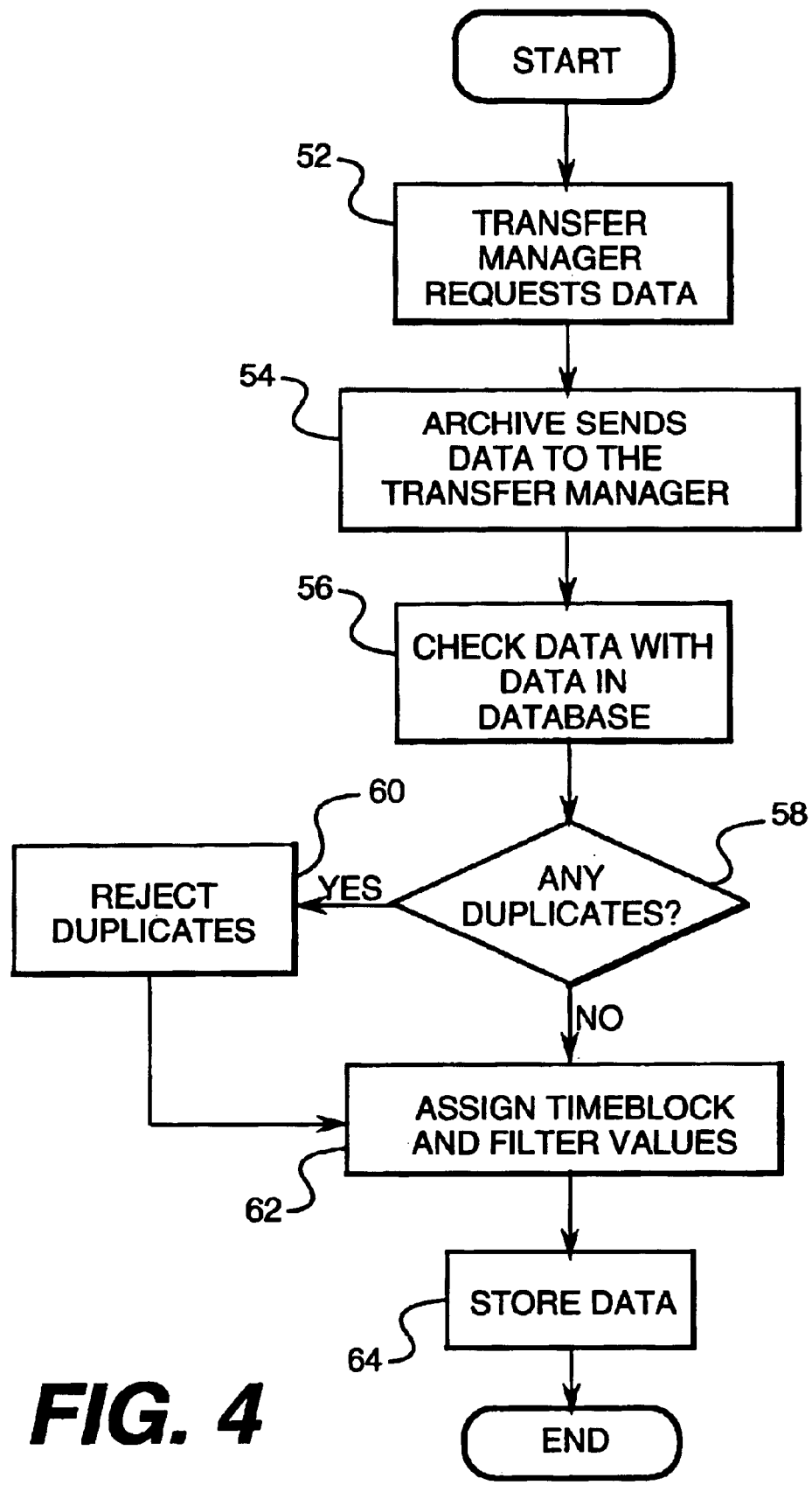
FIG. 4 shows a flow chart describing actions performed by the optimizing storage and retrieval system as it operates within the system shown in FIG. 3.

FIG. 4 shows a flow chart describing actions performed by the optimizing storage and retrieval system 28 within the system 36 shown in FIG. 3. In particular, this flow chart shows the interaction between the archive and the transfer manager component 30 and the transfer manager and the database 32. At block 52, the transfer manager component 30 initiates a transfer of data from the archive 38 by sending a request to the archive in the form of a query. The archive 38 receives the request and sends the data to the transfer manager component at 54 for a particular period of time. The transfer manager component 30 checks the received data with the data stored in the database at 56. The transfer manager component 30 then determines whether the received data are duplicates with the data in the database at 58. If the data are duplicates, then the transfer manager component 30 discards the duplicated data at 60 and continues with the processing. After all of the data has been reviewed, then the transfer manager component 30 assigns the data with the predetermined storage values at 62. As mentioned above, the predetermined storage values are the TimeBlock and Filter values. The transfer manager component then stores the marked-up data in the database at 64.

Figure 5:
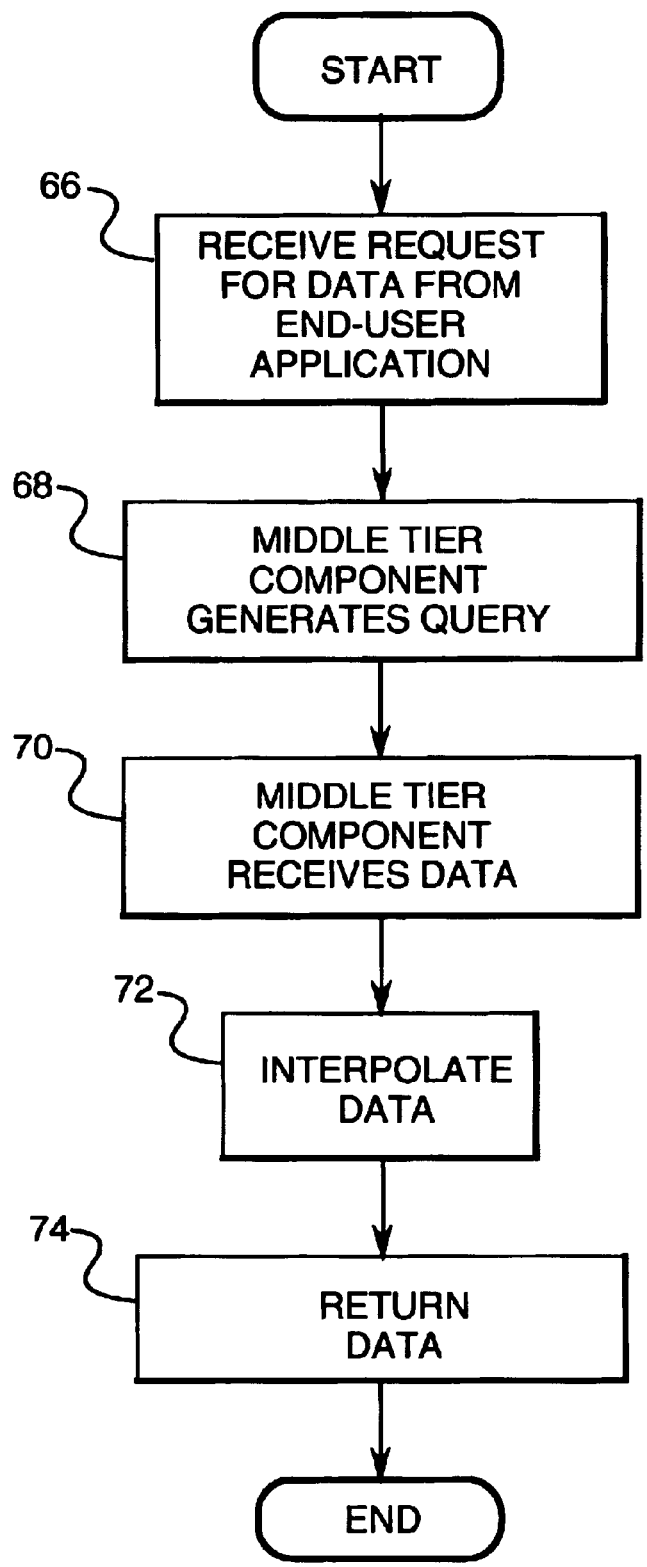
FIG. 5 shows another flow chart describing additional actions performed by the system shown in FIG. 3.

FIG. 5 shows another flow chart describing actions performed by the optimizing storage and retrieval system 28 within the system 36 shown in FIG. 3. In particular, this flow chart shows the interaction between the middle tier component 34 and the computing units 48. At block 66, the middle tier component 34 receives a request from one of the end-user applications running on one of the computing units. The middle tier component 34 receives the request and generates a query for extracting data from the database at 68. The database receives the request and sends the data to the middle tier component at 70. The middle tier component 34 receives the data and interpolates them in the aforementioned manner at 72. The middle tier component then returns the data to the computing unit 48 running the end-user application at 74.

The foregoing flow charts of this disclosure show the functionality and operation of the optimizing storage and retrieval system 28. In this regard, each block represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Furthermore, the functions can be implemented in programming languages such as Visual Basic, C++ or JAVA, however, other languages can be used. Also, the archive and database may be constructed using commercial databases including standard relational, object-oriented or hierarchical databases. Data manipulation operations, including retrieval, creation, modification, and deletion, can be implemented within the programming languages or within the archive or database using stored procedures or triggers or combinations.

The above-described optimizing storage and retrieval system 28 comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

It is apparent that there has been provided in accordance with this invention, an optimizing storage and retrieval system, method and computer product. While the invention has been particularly shown and described in conjunction with a preferred embodiment thereof, it will be appreciated that variations and modifications can be effected by a person of ordinary skill in the art without departing from the scope of the invention.

What is claimed is:

1. A system for optimizing storage and retrieval of data, comprising:
   a transfer manager component that acquires the data from an archive and assigns predetermined storage values to specified parameters that form the data structure of the acquired data;
   a database that stores the data acquired by the transfer manager component in accordance with the predetermined storage values; and
   a middle tier component that extracts the data in the database and time interpolates the data in accordance with the predetermined storage values.

2. The system according to claim 1, wherein the transfer manager component generates a query for requesting the data from the archive.

3. The system according to claim 1, wherein the transfer manager component examines data retrieved from the archive for duplicates with the data stored in the database.

4. The system according to claim 3, wherein the transfer manager component discards duplicate data.

5. The system according to claim 1, wherein the predetermined storage values comprise at least one of a time block value and a filter value.

6. The system according to claim 1, wherein the database uses the predetermined storage values as values to index using bit map indexes.

7. The system according to claim 1, wherein the middle tier component generates a query for requesting the data from the database.

8. A system for optimizing storage and retrieval of change detect monitoring data, comprising:
   a transfer manager component that acquires the change detect monitoring data from an archive and assigns predetermined storage values to specified parameters that form the data structure of the acquired data, wherein the predetermined storage values comprise at least one of a time block value and a time filter value;
   a database that stores the change detect monitoring data acquired by the transfer manager component in accordance with the time block value and time filter value; and a middle tier component that extracts the change detect monitoring data in the database and interpolates the data in accordance with the time block value and time filter value.

9. The system according to claim 8, wherein the transfer manager component generates a query for requesting the change detect monitoring data from the archive.

10. The system according to claim 8, wherein the database uses the predetermined storage values as values to index using bit map indexes.

11. The system according to claim 8, wherein the middle tier component generates a query for requesting the change detect monitoring data from the database.

12. system for optimizing storage and retrieval of change detect monitoring data, comprising:
   a transfer manager component that acquires the change detect monitoring data from an archive and assigns predetermined storage values to specified parameters that form the data structure of the acquired data, wherein the predetermined storage values comprise at least one of a time block value and a time filter value;
   a database that stores the change detect monitoring data acquired by the transfer manager component in accordance with the time block value and a time filter value, wherein the database uses the predetermined storage values as values to index using bit map indexes; and
   a middle tier component that extracts the change detect monitoring data in the database and interpolates the data in accordance with the time block value and time filter value.

13. The system according to claim 12, wherein the transfer manager component generates a query for requesting the change detect monitoring data from the archive.

14. The system according to claim 12, wherein the middle tier component generates a query for requesting the change detect monitoring data from the database.

15. A system for optimizing storage and retrieval of change detect monitoring data, comprising:
   means for acquiring the change detect monitoring data from an archive;
   means for assigning predetermined storage values to specified parameters that form the data structure of the acquired change detect monitoring data, wherein the predetermined storage values comprise at least one of a time block value and a time filter value;
   means for storing the acquired change detect monitoring data in accordance with the time block value and time filter value;
   means for extracting the stored change detect monitoring data; and
   means for interpolating the change detect monitoring data in accordance with the time block value and time filter value.

16. The system according to claim 15, wherein the acquiring means generates a query for requesting the change detect monitoring data from the archive.

17. The system according to claim 15, wherein the storing means uses the predetermined storage values as values to index using bit map indexes.

18. The system according to claim 15, wherein the extracting means generates a query for requesting the stored change detect monitoring data.

19. A system for optimizing storage and retrieval of data, comprising:
   a monitoring unit that monitors change detect data obtained by at least one sensing unit;
   an archive that stores the change detect monitoring data; and
   a remote storage and retrieval site comprising a transfer manager component that acquires the change detect monitoring data from the archive and assigns predetermined storage values to specified parameters that form the data structure of the acquired data, wherein the predetermined storage values comprise at least one of a time block value and a time filter value, a database that stores the change detect monitoring data acquired by the transfer manager component in accordance with the time block value and time filter value and a middle tier component that extracts the change detect monitoring data in the database and interpolates the data in accordance with the time block value and time filter value.

20. The system according to claim 19, further comprising a communication device that facilitates communications between the archive and the remote storage and retrieval site.

21. The system according to claim 19, further comprising at least one client computing device running an end-user application.

22. The system according to claim 21, further comprising a communication device that facilitates communications between the remote storage and retrieval site and the at least one client computing device.

23. The system according to claim 19, wherein the transfer manager component generates a query for requesting the change detect monitoring data from the archive.

24. The system according to claim 19, wherein the transfer manager component examines change detect monitoring data retrieved from the archive for duplicates with the data stored in the database.

25. The system according to claim 24, wherein the transfer manager component discards duplicate data.

26. The system according to claim 19, wherein the database uses the predetermined storage values as values to index using bit map indexes.

27. The system according to claim 19, wherein the middle tier component generates a query for requesting the change detect monitoring data from the database.

28. A method for optimizing storage and retrieval of data, comprising:
   acquiring the data from an archive;
   assigning predetermined storage values to specified parameters that form the data structure of the acquired data;
   storing the acquired data in a database in accordance with the predetermined storage values;
   extracting the data in the database; and
   time interpolating the data in accordance with the predetermined storage values.

29. The method according to claim 28, wherein the acquiring comprises generating a query for requesting the data from the archive.

30. The method according to claim 28, wherein the acquiring comprises examining data retrieved from the archive for duplicates with the data stored in the database.

31. The method according to claim 30, further comprising discarding duplicate data.

32. The method according to claim 28, wherein the predetermined storage values comprise at least one of a time block value and a filter value.

33. The method according to claim 28, further comprising using the predetermined storage values as values to index using bit map indexes.

34. The method according to claim 28, wherein the extracting comprises generating a query for requesting the data from the database.

35. A method for optimizing storage and retrieval of change detect monitoring data, comprising:
   acquiring the change detect monitoring data from an archive;
   assigning predetermined storage values to specified parameters that form the data structure of the acquired data, wherein the predetermined storage values comprise at least one of a time block value and a time filter value;
   storing the acquired change detect monitoring data in a database in accordance with the time block value and time filter value;
   extracting the change detect monitoring data in the database; and
   interpolating the change detect monitoring data in accordance with the time block value and time filter value.

36. The method according to claim 35, wherein the acquiring comprises generating a query for requesting the change detect monitoring data from the archive.

37. The method according to claim 35, further comprising using the predetermined storage values as values to index using bit map indexes.

38. The method according to claim 35, wherein the extracting comprises generating a query for requesting the change detect monitoring data from the database.

39. A method for optimizing storage and retrieval of change detect monitoring data, comprising:
   acquiring the change detect monitoring data from an archive;
   assigning predetermined storage values to specified parameters that form the data structure of the acquired data, wherein the predetermined storage values comprise at least one of a time block value and a time filter value;
   storing the acquired change detect monitoring data in a database in accordance with the time block value and time filter value, wherein the database uses the predetermined storage values as values to index using bit map indexes;
   extracting the change detect monitoring data in the database; and
   interpolating the change detect monitoring data in accordance with the time block value and time filter value.

40. A method for optimizing storage and retrieval of data, comprising:
   monitoring change detect data;
   storing the change detect monitoring data in an archive;
   acquiring the change detect monitoring data from the archive;
   assigning predetermined storage values to specified parameters that form the data structure of the acquired data, wherein the predetermined storage values comprise at least one of a time block value and a time filter value;
   storing the acquired change detect monitoring data in a database in accordance with the time block value and time filter value;
   extracting the change detect monitoring data in the database; and
   interpolating the data in accordance with the time block value and time filter value.

41. The method according to claim 40, wherein the acquiring comprises generating a query for requesting the change detect monitoring data from the archive.

42. The method according to claim 40, wherein the acquiring comprises examining change detect monitoring data retrieved from the archive for duplicates with the data stored in the database.

43. The method according to claim 42, further comprising discarding duplicate data.

44. The method according to claim 40, further comprising using the predetermined storage values as values to index using bit map indexes.

45. The method according to claim 40, wherein the extracting comprises generating a query for requesting the change detect monitoring data from the database.

46. A computer-readable medium storing computer instructions for instructing a computer system to optimize storage and retrieval of data, the computer instructions comprising:
   acquiring the data from an archive;
   assigning predetermined storage values to specified parameters that form the data structure of the acquired data;
   storing the acquired data in a database in accordance with the predetermined storage values;
   extracting the data in the database; and
   time interpolating the data in accordance with the predetermined storage values.

47. The computer-readable medium according to claim 46, wherein the acquiring instructions comprises instructions for generating a query for requesting the data from the archive.

48. The computer-readable medium according to claim 46, wherein the acquiring instructions comprises instructions for examining data retrieved from the archive for duplicates with the data stored in the database.

49. The computer-readable medium according to claim 48, further comprising instructions for discarding duplicate data.

50. The computer-readable medium according to claim 46, wherein the predetermined storage values comprise at least one of a time block value and a filter value.

51. The computer-readable medium according to claim 46, further comprising instructions for using the predetermined storage values as values to index using bit map indexes.

52. The computer-readable medium according to claim 46, wherein the extracting instructions comprise instructions for generating a query for requesting the data from the database.

53. A computer-readable medium storing computer instructions for instructing a computer system to optimize storage and retrieval of change detect monitoring data, the computer instructions comprising:
   acquiring the change detect monitoring data from an archive;
   assigning predetermined storage values to specified parameters that form the data structure of the acquired data, wherein the predetermined storage values comprise at least one of a time block value and a time filter value;
   storing the acquired change detect monitoring data in a database in accordance with the time block value and time filter value;
   extracting the change detect monitoring data in the database; and interpolating the change detect monitoring data in accordance with the time block value and time filter value.

54. A computer-readable medium storing computer instructions for instructing a computer system to optimize storage and retrieval of change detect monitoring data, the computer instructions comprising:

acquiring the change detect monitoring data from an archive;

assigning predetermined storage values to specified parameters that form the data structure of the acquired data, wherein the predetermined storage values comprise at least one of a time block value and a time filter value;

storing the acquired change detect monitoring data in a database in accordance with the time block value and time filter value, wherein the database uses the predetermined storage values as values to index using bit map indexes;

extracting the change detect monitoring data in the database; and interpolating the change detect monitoring data in accordance with the time block value and time filter value.

55. A computer-readable medium storing computer instructions for instructing a computer system to optimize storage and retrieval of change detect monitoring data, the computer instructions comprising:

monitoring change detect data;

storing the change detect monitoring data in an archive;

acquiring the change detect monitoring data from the archive;

assigning predetermined storage values to specified parameters that form the data structure of the acquired data, wherein the predetermined storage values comprise at least one of a time block value and a time filter value;

storing the acquired change detect monitoring data in a database in accordance with the time block value and time filter value;

extracting the change detect monitoring data in the database; and interpolating the data in accordance with the time block value and time filter value.

* * * * *